United States Patent [19]
Tse et al.

[11] Patent Number: 6,102,964
[45] Date of Patent: *Aug. 15, 2000

[54] FITTING FOR INCREMENTAL COMPILATION OF ELECTRONIC DESIGNS

[75] Inventors: John Tse, El Cerrito; Fung Fung Lee, Milpitas; David Wolk Mendel, Sunnyvale, all of Calif.

[73] Assignee: Altera Corporation, San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/958,436

[22] Filed: Oct. 27, 1997

Related U.S. Application Data

[60] Provisional application No. 60/029,277, Oct. 28, 1996.

[51] Int. Cl.[7] .................................................... G06F 17/50

[52] U.S. Cl. ........................................................... 716/18

[58] Field of Search ...................................... 364/488, 489, 364/490, 491, 468.28; 395/500.08, 500.09, 500.1, 500.11, 500.12; 716/1, 2, 3, 18

[56] References Cited

U.S. PATENT DOCUMENTS

| | | | |
|---|---|---|---|
| 3,617,714 | 11/1971 | Kernighan | 235/150 |
| 5,111,413 | 5/1992 | Lazansky et al. | 364/578 |
| 5,301,318 | 4/1994 | Mittal | 395/600 |
| 5,335,320 | 8/1994 | Iwata et al. | 395/155 |

(List continued on next page.)

OTHER PUBLICATIONS

Wang et al., "Incremental Netlist Compilation for IKOS Hardware Logic Simulator", IEEE 1989, pp. pq–3.1–pq–3.4.
Jones, "Fast Incremental Netlist Compilation of Hierarchical Schematics," IEEE 1989, pp. 326–329.
Limaiem and Ammar "A Computer Assisted Process Planning System Based on Optimization Criteria Compromises," IEEE International Symposium on Assembly and Task Planning, Aug. 1995, p. 101–106.
Mace and Diamond "Use of Programmable Logic Devices as an Aid to System Design," IEE Colloquium on Programmable Logic Devices for Digital Systems Implementation, 1990, p. 1/1–1/5.
Ginetti and Bresen "Modifying the netlist after Placement for Performance Improvement," 1993 IEEE Custom Integrated Circuits Conference, p. 9.2.1–9.2.4.
Peter Ramyalal Suaris, et al., "A Quadrisection–Based Combined Place and Route Scheme for Standard Cells," Mar. 1989, pp. 234–244, *IEEE*.

*Primary Examiner*—Paul R. Lintz
*Assistant Examiner*—Leigh Marie Garbowski
*Attorney, Agent, or Firm*—Beyer Weaver & Thomas, LLP

[57] ABSTRACT

A technique is disclosed for efficiently placing logic cells from an electronic design during an incremental recompile. This is accomplished by fixing in place as many logic cells as possible during the recompile procedure. To understand how this works, recognize than an "original electronic design" has already been fully compiled. Now, a user has made one or more changes to the original electronic design to produce a "changed electronic design." The disclosed technique fits the changed electronic design, during incremental recompile, without effecting too much of the logic previously fit during compilation of the original electronic design. Initially, a compiler attempts to fit logic cells of the changed portion of the electronic design onto available logic elements of the hardware device while confining logic cells from the unchanged portion of the changed electronic design to their original positions.

If this fails, the compiler allows logic cells from the unchanged portion of the changed electronic design to shift by a limited amount to other logic elements within the target hardware device. At first, this shifting is fairly constrained in order to preserve as much of the original compilation's placement as possible. However, if fitting can not be accomplished under these constraints, gradually the constraints are lifted, until a fit is achieved.

40 Claims, 10 Drawing Sheets

U.S. PATENT DOCUMENTS

| | | | |
|---|---|---|---|
| 5,341,308 | 8/1994 | Mendel | 364/489 |
| 5,436,849 | 7/1995 | Drumm | 364/490 |
| 5,442,790 | 8/1995 | Nosenchuck | 395/700 |
| 5,499,192 | 3/1996 | Knapp et al. | 364/489 |
| 5,513,124 | 4/1996 | Trimberger et al. | 364/491 |
| 5,526,517 | 6/1996 | Jones et al. | 395/600 |
| 5,537,295 | 7/1996 | Van Den Bout et al. | 361/767 |
| 5,541,849 | 7/1996 | Rostoker et al. | 364/489 |
| 5,550,782 | 8/1996 | Cliff et al. | 365/230.03 |
| 5,583,759 | 12/1996 | Tredennick et al. | 361/790 |
| 5,636,133 | 6/1997 | Chesebro et al. | 364/491 |
| 5,661,660 | 8/1997 | Freidin | 364/489 |
| 5,670,895 | 9/1997 | Kazarian | 326/39 |
| 5,691,912 | 11/1997 | Duncan | 364/490 |
| 5,696,454 | 12/1997 | Trimberger | 326/38 |
| 5,712,794 | 1/1998 | Hong | 395/500.12 |
| 5,721,912 | 2/1998 | Stepczyk et al. | 395/633 |
| 5,724,251 | 3/1998 | Heavlin | 395/500.12 |
| 5,754,441 | 5/1998 | Tokunoh et al. | 364/488 |
| 5,812,847 | 9/1998 | Joshi et al. | 395/682 |
| 5,825,661 | 10/1998 | Drumm | 395/500.12 |
| 5,831,863 | 11/1998 | Scepanovic et al. | 364/488 |
| 5,859,776 | 1/1999 | Sato et al. | 364/468.28 |
| 5,867,396 | 2/1999 | Parlour | 364/489 |
| 5,867,399 | 2/1999 | Rostoker et al. | 364/489 |
| 5,870,308 | 2/1999 | Dangelo et al. | 364/489 |
| 5,875,112 | 2/1999 | Lee | 716/12 |
| 5,896,521 | 4/1999 | Shackleford et al. | 395/500 |
| 5,903,475 | 5/1999 | Gupte et al. | 364/578 |

FITTING FOR INCREMENTAL COMPILATION OF ELECTRONIC DESIGNS

CROSS REFERENCE TO RELATED APPLICATIONS

This application claims priority of provisional U.S. patent application Ser. No. 60/029,277, filed Oct. 28, 1996, entitled "Tools For Designing Programmable Logic Devices" which is incorporated by reference.

This invention is related to U.S. patent application Ser. No. 08/952,002 (attorney docket no. ALTRP017/A343), filed on the same day as this patent application, naming B. Pedersen et al. as inventors, and entitled "GENERATION OF SUB-NET LISTS FOR USE IN INCREMENTAL COMPILATION." That application is incorporated herein by reference in its entirety and for all purposes.

This invention is also related to U.S. patent application Ser. No. 08/958,670 (attorney docket no. ALTRP033/A404), filed on the same day as this patent application, naming D. Mendel as inventor, and entitled "PARALLEL PROCESSING FOR COMPUTER ASSISTED DESIGN ON ELECTRONIC DEVICES." That application is incorporated herein by reference in its entirety and for all purposes.

This invention is also related U.S. patent application Ser. No. 08/958,626 (attorney docket No. ALTRP008/A334), filed on the same day as this patent application, naming F. Heile et al. as inventors, and entitled "INTERFACE FOR COMPILING DESIGN VARIATIONS IN ELECTRONIC DESIGN ENVIRONMENTS." That application is incorporated herein by reference in its entirety and for all purposes.

This invention is also related to U.S. patent application Ser. No. 08/958,778 (attorney docket no. ALTRP006/A318), filed on the same day as this patent application, naming T. Southgate as inventor, and entitled "METHOD AND APPARATUS FOR AUTOMATED CIRCUIT DESIGN." That application is incorporated herein by reference in its entirety and for all purposes.

This invention is also related to U.S. patent application Ser. No. 08/958,434 (attorney docket no. ALTRP013/A339), filed on the same day as this patent application, naming T. Southgate et al. as inventors, and entitled "GRAPHIC EDITOR FOR BLOCK DIAGRAM LEVEL DESIGN OF CIRCUITS." That application is incorporated herein by reference in its entirety and for all purposes.

This invention is also related to U.S. patent application Ser. No. 08/958,432 (attorney docket no. ALTRP014/A340), filed on the same day as this patent application, naming T. Southgate et al. as inventors, and entitled "DESIGN FILE TEMPLATES FOR IMPLEMENTATION OF LOGIC DESIGNS." That application is incorporated herein by reference in its entirety and for all purposes.

This invention is also related to U.S. patent application Ser. No. 08/958,414 (attorney docket no. ALTRP016/A342), filed on the same day as this patent application, naming T. Southgate as inventor, and entitled "METHOD FOR PROVIDING REMOTE SOFTWARE TECHNICAL SUPPORT." That application is incorporated herein by reference in its entirety and for all purposes.

This invention is also related to U.S. patent application Ser. No. 08/958,777 (attorney docket no. ALTRP018/A344), filed on the same day as this patent application, naming T. Southgate as inventor, and entitled "METHOD FOR SIMULATING A CIRCUIT DESIGN." That application is incorporated herein by reference in its entirety and for all purposes.

This invention is also related to U.S. patent application Ser. No. 08/957,957 (attorney docket no. ALTRP007/A333), filed on the same day as this patent application, naming F. Heile et al. as inventor, and entitled "WORKGROUP COMPUTING FOR ELECTRONIC DESIGN AUTOMATION." That application is incorporated herein by reference in its entirety and for all purposes.

This invention is also related to U.S. patent application Ser. No. 08/958,798 (attorney docket no. ALTRP012/A338), filed on the same day as this patent application, naming F. Heile as inventor, and entitled "LOCAL COMPILATION IN CONTEXT WITHIN A DESIGN HIERARCHY." That application is incorporated herein by reference in its entirety and for all purposes.

This invention is also related to U.S. patent application Ser. No. 08/958,435 (attorney docket no. ALTRP010/A336), filed on the same day as this patent application, naming Alan L. Herrmann et al. as inventors, and entitled "EMBEDDED LOGIC ANALYZER FOR A PROGRAMMABLE LOGIC DEVICE." That application is incorporated herein by reference in its entirety and for all purposes.

This invention is also related to U.S. patent application Ser. No. 08/958,431 (attorney docket no. ALTRP015/A341), filed on the same day as this patent application, naming F. Heile as inventor, and entitled "ELECTRONIC DESIGN AUTOMATION TOOL FOR DISPLAY OF DESIGN PROFILE." That application is incorporated herein by reference in its entirety and for all purposes.

BACKGROUND OF THE INVENTION

Electronic design automation ("EDA") is becoming increasingly complicated and time consuming, due in part to the greatly increasing size and complexity of the electronic devices designed by EDA tools. Such devices include general purpose microprocessors as well as custom logic devices including Application Specific Integrated Circuits ("ASICs"). Examples of ASICs include non-programmable gate arrays, field programmable gate arrays ("FPGAs"), and complex programmable logic devices ("PLDs" or "CPLDs"). The design of even the simplest of these devices typically involves generation of a high level design, logic simulation, generation of a network, timing simulation, etc. Usually, timing simulation cannot be performed until the design has been compiled to the point where the various gate level entities are synthesized and placed and the lines therebetween routed on a target hardware device. This compilation requires that a design project (or a significant piece of it) be functionally completed.

Meeting timing requirements is essential to the correct operation of an integrated circuit. For example, for a plurality of D-type flip-flops ("DFFs") to feed through some logic to another plurality of DFFs, it is generally required that the signals form the first set of DFFs must finish propagating through any intermediate logic and have settled to their final state on the D-input of each of the destination DFFs before the next rising edge of the clock. (In fact they must finish before the next clock edge by an amount known as the setup delay of the register $T_{su}$.) If the delay through the resulting logic is greater than the time between rising clock edges, then the state that the destination DFFs will hold on the next clock edge will be undefined.

Quite typically, a designer (or the compiler itself) will modify a design after an initial compilation. This may be required when a timing simulation conducted after compilation indicates a problem. Or, the product requirements may change in the middle of the device's development. Regardless of why a design change is necessary, that change requires a recompile. Unfortunately, each compilation consumes significant time, so multiple recompiles translates to significantly longer development times. This can greatly slow the time to market for an integrated circuit under design. Because PLDs rely on a short time to market as a major selling point, slow development can erase any commercial advantage.

The problem is compounded because maximum CPLD device sizes are increasing at a speed slightly greater than that predicted by Moore's law, (i.e., each new chip contains roughly twice as much capacity as its predecessor, and each chip is released within 18–24 months of the previous chip). If compilation time was a linear function of design size then it would be expected that the time to compile the largest device on the most powerful computer would remain approximately constant. Unfortunately, compile times are typically proportional to $n^2$, where n is the number of logic elements on a device. This means that a design twice as big takes four times as long to compile. Consequently, the compile times for the largest devices are accelerating. It is not uncommon for large projects to compile for about 24 hours or more on a modern workstation. Obviously, the fastest compilers will become critical components of integrated circuit design environments.

Large designs often benefit from performing and comparing multiple compilations, each based upon a different compilation parameters or slight design changes. For example, the heuristics for synthesizing and/or the heuristics for mapping a design can be varied to emphasize different goals (e.g., speed versus compact fit). Obviously, given long compile times, most designers do not have the luxury of running multiple compilations for comparison.

An important advance in the effort to reduce compilation time for large complex devices is incremental compilation. In essence, incremental compilation involves using a previously compiled design such that only a fraction of that design must be recompiled after a user makes one or more changes to the design. Incremental compilation requires at least two steps: (1) delineating a sphere of influence of user changes in a previously compiled design (the sphere of influence typically being defined within a netlist), and (2) recompiling the logic from within this sphere of influence into appropriate logic elements available within a target hardware device. To maximize efficiency, the compiler should minimize changes to portions of the electronic design (and corresponding regions of a target hardware device) which are not directly affected by the design change.

One suitable technique for delineating a sphere of influence of user changes to a previously compiled design (step 1) is a "netlist differencing" procedure followed by a "sub-netlist" identification algorithm. Netlist differencing is described in U.S. patent application Ser. No. 08/619,073, filed on Mar. 20, 1996, naming Lee as inventor and entitled "METHODS FOR IMPLEMENTING CIRCUIT DESIGNS IN PHYSICAL CIRCUITS." A sub-netlist identification algorithm is described in U.S. patent application Ser. No. 08/952,002, filed on the same day as the instant patent application, naming B. Pedersen et al. as inventors and entitled "GENERATION OF SUB-NET LISTS FOR USE IN INCREMENTAL COMPILATION." Both of these documents are incorporated herein by reference for all purposes.

At this point, an effective incremental compiler cannot be realized until a technique for placing changed portions of an electronic design is developed. Thus, there is a need for a technique that efficiently and correctly places changed logic cells during incremental recompile.

SUMMARY OF THE INVENTION

The present invention provides a technique and associated compiler for efficiently placing logic cells from an electronic design during an incremental recompile. It accomplished this by fixing in place as many logic cells as possible during the recompile procedure. To understand how this works, recognize that an "original electronic design" has already been fully compiled. Now, a user or the design software has made one or more changes to the original electronic design to produce a "changed electronic design." This invention fits the changed electronic design, during incremental recompile, without effecting too much of the logic previously fit during compilation of the original electronic design.

In one aspect, the invention may be characterized as a method—typically implemented on a compiler—having the following sequence of operations: (a) receiving a compiled original electronic design (this specifies the placement of logic cells from the original electronic design on "logic elements" (the fundamental hardware units) of a target hardware device (e.g., an unprogrammed CPLD)); (b) accepting a change in the original electronic design to create a changed electronic design, such that the changed electronic design includes (i) a changed portion including logic cells affected by the change to the design, and (ii) an unchanged portion including logic cells not affected by the change; (c) providing logic cells from the unchanged portion of the changed electronic design to an unchanged region of the target hardware device (this is the region of the hardware device where the logic cells from the unchanged portion of the changed electronic were placed in the previously compiled original electronic design); and (d) attempting to fit logic cells of the changed portion of the electronic design onto logic elements located outside of the unchanged region of the target hardware device while confining logic cells from the unchanged portion of the changed electronic design to their original positions in the unchanged region of the target hardware device (as specified in (c)).

If the attempt at (d) fails to fit the changed design, the compiler allows logic cells from the unchanged portion of the changed electronic design to shift by a limited amount to other logic elements within the target hardware device. At first, this shifting is fairly constrained in order to preserve as much of the original compilation's placement as possible. However, if fitting can not be accomplished under these constraints, gradually the constraints are lifted, until a fit is achieved. In some cases, a fit may not be obtained until all constraints are relaxed—at which point, the compiler has essentially performed a full compile. Nevertheless, in many cases, the fit will be achieved well before a full recompile is required, thereby saving considerable resources during recompile.

In a preferred embodiment, the constraints operate as follows. In a completely constrained system, all cells from the unchanged portion of the design are fixed in exactly the positions (logic elements) to which they were assigned during the full compile of the original design. As noted, this may not allow sufficient flexibility to fit the changed portion of the design. If this is the case, then a first constraint is relaxed and fitting is retried. In one embodiment, this initial relaxation allows logic cells from the unchanged portion of the electronic design to move from their previously assigned logic element to a related logic element. The related logic elements may be a group of proximate logic elements coupled by local interconnects and deemed a "block." Relaxation of this initial constraint allows movement within the block only. Higher level constraints may, if necessary, be subsequently relaxed. This will allow logic cells to shift outside of their initial blocks to logic elements located in other blocks but within some higher level classification of elements (e.g., rows of blocks). Ultimately, if all constraints are relaxed, the logic cells may move to any logic element, regardless of location in the target hardware device.

Further details and advantages of the invention are provided in the following Detailed Description and the associated figures.

DETAILED DESCRIPTION OF THE PREFERRED EMBODIMENTS

1. Definitions

Figure 1A:
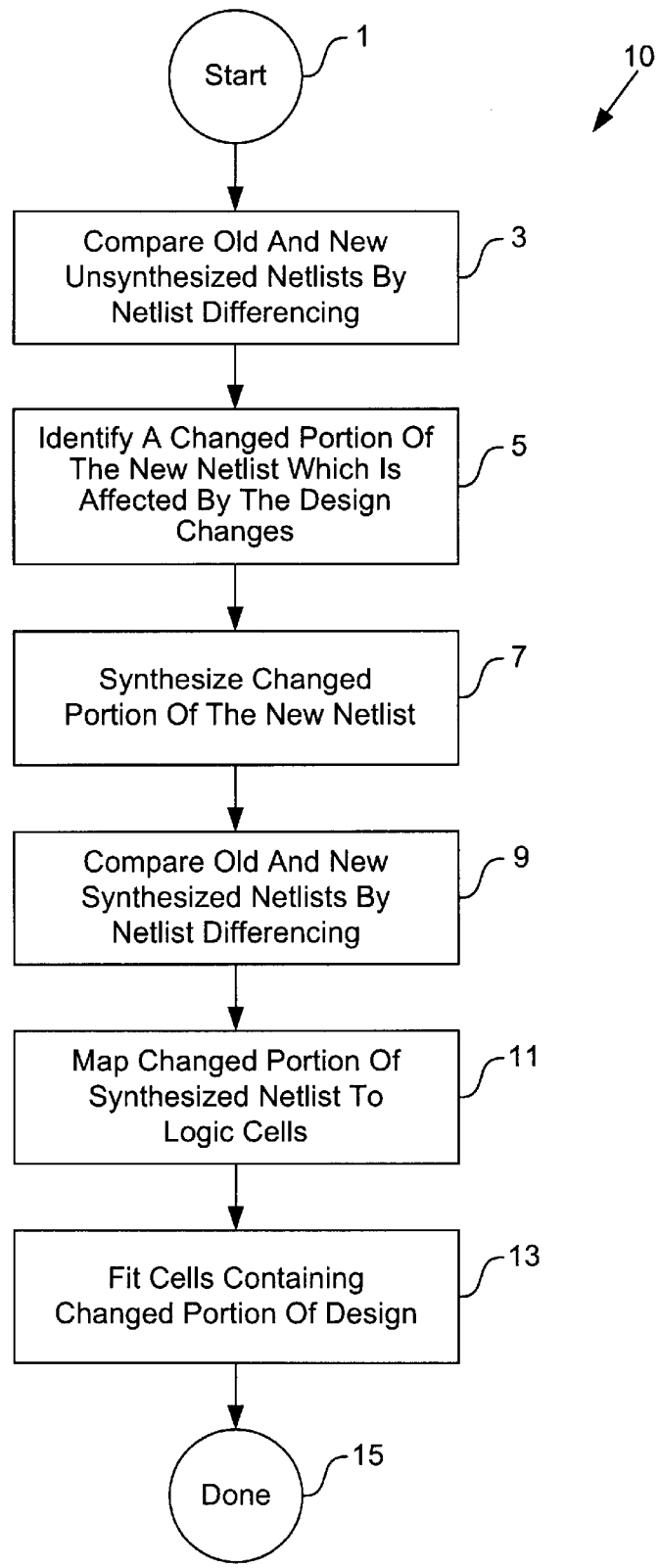
FIG. 1A is a process flow diagram illustrating incremental compilation in accordance with one embodiment of this invention.

Some of terms used herein are not commonly used in the art. Other terms have multiple meanings in the art. Therefore, the following definitions are provided as an aid to understanding the description that follows. The invention as set forth in the claims should not necessarily be limited by these definitions.

The term "fitting" is used throughout this specification to describe a process whereby a compiler fits an electronic design onto a target hardware device. The term "fit" may be used interchangeably with the phrase "place and route." As this synonym suggests, fitting can be divided into two phases: a placement phase and a routing phase. The present invention is concerned primarily with the placement phase of the fitting procedure. At this phase, a compiler positions logic cells of the electronic design with respect to logic elements of a target hardware device. The invention may employ generic routing algorithms—including many conventional and commercially available algorithms—employed during design development.

The term "compiler" is used throughout this specification to refer to software—and apparatus for running such software—that compiles an electronic design. Its functions may include synthesizing a netlist, simulating an electronic design, etc. In the context of this invention, a compiler will also fit an electronic design on a target hardware device. As part of the fitting, the compiler will place logic cells of the electronic design onto logic elements of target hardware device.

The term "electronic design" refers to the logical structure of an electronic device such as an integrated circuit. It may be implemented on hardware (usually referred to herein generically as a "target hardware device"). During the design and development effort, an electronic design may exist in various states or stages. It may be provided as a high level Boolean representation (encoded in a hardware design language for example), a schematic or circuit representation, or any other form representing the logical arrangement of a device. It may include other facets such as floor-plan constraints, wave-form constraints, timing constraints, fitting constraints, etc. At the gate level, it may exist as a netlist (whether synthesized or not) prior to placement on a target hardware device. It may even include completed place and route assignments.

When in the form of a synthesized netlist, an electronic design may be divided into "logic cells" representing various logic functions within the electronic design. These logic cells are mapped onto "logic elements" of the target hardware device during compilation. The criteria for mapping gates into logic cells is that the resulting logic cell must be able to be put into one logic element. An example of a logic cell is a collection of gates (connected in some way and implemented in a look-up table) combined with a register and configured to implement a multiplexer.

The term "changed cell" is used throughout this document in reference to logic cells that are affected by a user's change to an electronic design after that design previously has been compiled. In the context of this invention, a compiler must reconsider the positional assignments of changed cells on a target hardware device. In a specific embodiment, a changed cell may be any one of the following: (1) a cell whose fan-out has changed, (2) a cell whose fan-in has changed, and (3) a cell that is new. Collectively, the changed logic cells of an electronic design define a "changed portion" of that electronic design. Collectively, the unchanged logic cells of an electronic design define an "unchanged portion" of the electronic design.

From the point of view of fitting software (place and route), the gates in a cell are largely irrelevant. As long as a logic cell has the same fan-ins and fan-outs, the fitting software will consider the cell unchanged. Notice that the gates that are mapped to this logic cell may be different. For example, in a first electronic design, cell A included an OR-gate, and AND-gate, and a register, along with a specified fan-in and fan-out. Later, in a changed electronic design, the cell is changed so that it includes only an AND-gate and a register. However, if the fan-in and fan-out remain the same, the fitting software will consider it to be an unchanged logic cell.

The term "target hardware device" refers to a hardware device on which an electronic design is implemented. Examples include circuit boards and systems including multiple electronic devices and multi-chip modules, as well as integrated circuits. Specific examples of integrated circuits include traditional integrated circuits with full custom layouts, hardwired ASICs (e.g., gate arrays) designed with high level design tools, and programmable ASICs such as FPGAs and PLDs. In the case of non-programmable integrated circuits such as gate arrays, the electronic design defines the arrangement of metal lines on one or more metallization layers of the target hardware device. In the case of programmable integrated circuits such as PLDs, the electronic design defines the gates as well as interconnects to be programmed on the target hardware device.

In the context of this invention, a target hardware device typically includes a plurality of "logic elements" which house logic cells from an electronic design in order to implement the logic functions specified by these cells. The logic elements are typically a fundamental element of the hardware device's architecture on which different logic gates can be defined. These elements may be grouped into blocks such that each logic element is associated with a block (or other arbitrary containment entity). There may be higher level organization in the device such that logic blocks are grouped into rows or some other arbitrary entity.

In the case of a FLEX10K CPLD (available from Altera Corporation of San Jose, Calif.), for example, logic elements are provided at the bottom level of a containment hierarchy. In this architecture, multiple logic elements are grouped into logic array blocks (LABs), which are in turn organized into half-rows, which are in turn organized into rows. By way of contrast, in the case of the XC4000 (available from Xylinx Corporation of San Jose, Calif.) logic elements are provided in a flat grid without a hierarchical structure.

To facilitate comparison between an initially compiled electronic design and an incrementally recompiled version of that electronic design, logic elements are termed either "unchanged" or "changed." Upon recompile, unchanged logic elements are those housing unchanged logic cells and changed logic elements are those housing changed logic cells (as described above). The unchanged logic elements together define an "unchanged region" of the hardware device and the changed logic elements together define a "changed region" of the hardware device.

2. Context of the Invention

While most examples presented herein depict PLD design compilation, the methodologies of this invention find general application in any electronic design compilation employing a fitting routine. In the case of a traditional integrated circuit design created using high level design tools, for example, compilation involves the following steps: (a) synthesis from a hardware design language (e.g., VHDL or Verilog), (b) automatic place and route, and (c) simulations. Thus, the present invention may be employed during step (b).

This invention may be integrated in a conventional PLD design effort as follows. Initially, a full compile of an "original" design is performed. This full compile may be performed using traditional PLD compilation procedures. The procedure takes as an input an unsynthesized netlist representing a schematic of the user's design.

This netlist is used to describe the functionality of a digital circuit design that can be implemented on a programmable logic device or other target hardware device. The netlist is represented as a hierarchical collection of gates, state machines, high level constructs such as counters or adders, or any other means of defining a collection of outputs based on a collection of inputs. The nodes of the netlist (gates, state machines, etc.) are connected together via nets. Each of these nets is associated with a named digital signal. A logic synthesizer module of a compiler takes this netlist and simplifies its gate representation in a process referred to as synthesis.

The process of simplifying a gate representation consists of performing Boolean manipulations on the netlist: removing redundant gates or replacing the gates of a sub-network of the design with an equivalent network of newly generated "synthesized gates". These synthesized gates do not necessarily have a one-to-one correspondence to any single gate in the original netlist.

Next, a technology mapper module of a compiler maps the gates of the synthesized netlist into logic cells. For each cell, the technology mapper may map one or more gates into a logic cell. As mentioned, each logic cell must be able to be put into one logic element which, as noted, corresponds a basic physical element of the target hardware device (e.g., a PLD). After technology mapping, the various cells of the electronic design may have to be partitioned between various hardware entities. In some cases, the hardware entities are multiple chips; assuming the design is too big to fit on a single chip. Also, the design may be partitioned between entities on a single chip such as rows or quadrants defined according to the architecture of the target hardware device. The purpose of partitioning is to minimize the number signals crossing boundaries between hardware entities.

To complete full compilation, a place and route module of the compiler places the logic cells into the logic elements within the appropriate partition of the programmable logic device. These logic elements have inputs and outputs which are connected together via wires (sometimes referred to as "interconnects") during the routing stage of place and route.

After the full compilation is concluded, the used may decide to make a change to the overall design which was previously subject to the full compilation. To reduce the time required to compile the user's changed design, incremental compilation may be applied. One approach to incremental compilation is illustrated as a process flow diagram in FIG. 1A. As shown, an incremental compilation 10 starts at 1 and in a process step 3 a compiler compares the unsynthesized netlists of the original and changed designs by a process known as netlist differencing. Netlist differencing identifies all logic elements that have been changed in the original unsynthesized netlist. For example, some gates may be removed, new gates may be added, the function of a gate may be changed, the inputs to a gate of the same function may be changed, etc.

One suitable approach to netlist differencing is described in is described in U.S. patent application Ser. No. 08/619,073, filed on Mar. 20, 1996, naming Lee as inventor and entitled "METHODS FOR IMPLEMENTING CIRCUIT DESIGNS IN PHYSICAL CIRCUITS." That document is incorporated herein by reference for all purposes. Briefly, netlist differencing involves matching components (e.g., gates) of two netlists having the same user-assigned names. Those components having the same names and features are verified as matching. The unmatched components are further compared by considering the basic features that they have in common and the basic features of their neighboring components. After the component matching procedures have been completed, inter-component connections (nets) are considered. For each matched component, if a matched immediate neighbor of that component is not matched to one of the immediate neighbors of that component's match in the other netlist, then the connection between the component and the matched immediate neighbor is marked changed.

After netlist differencing at step 3, the compiler next identifies a changed portion of the unsynthesized netlist at a step 5. The changed portion contains the logic elements that are affected by the design changes identified at step 3. The compiler may perform step 5 via an appropriate algorithm such as the sub-netlist idenfication algorithm mentioned above. Next, the compiler synthesizes the changed portion of the changed design at a step 7. To save resources, it typically does not synthesize the unchanged portion of the design.

Now the newly synthesized netlist may be compared against the synthesized netlist from the original design by netlist differencing. See step 9. This confirms which gates of the synthesized netlist have actually changed. Only those gates need be considered in subsequent incremental compilation procedures. Next, at a step 11, the compiler maps the changed gates of the synthesized netlist into logic cells as described above. Finally, at a step 13, the compiler fits the incrementally synthesized and mapped logic cells into a target hardware device, while preserving as much of the original fitting as possible. The process concludes at 15. The step 13 fitting process is the subject of this invention.

More specifically, the placement of logic cells during incremental recompile is the subject of this invention. A primary goal of the procedures of this invention is to place the changed cells on the hardware with a minimal disruption in the existing hardware layout. However, it must be ensured that the newly placed logic accurately implements the user's changed design.

Figure 1B:
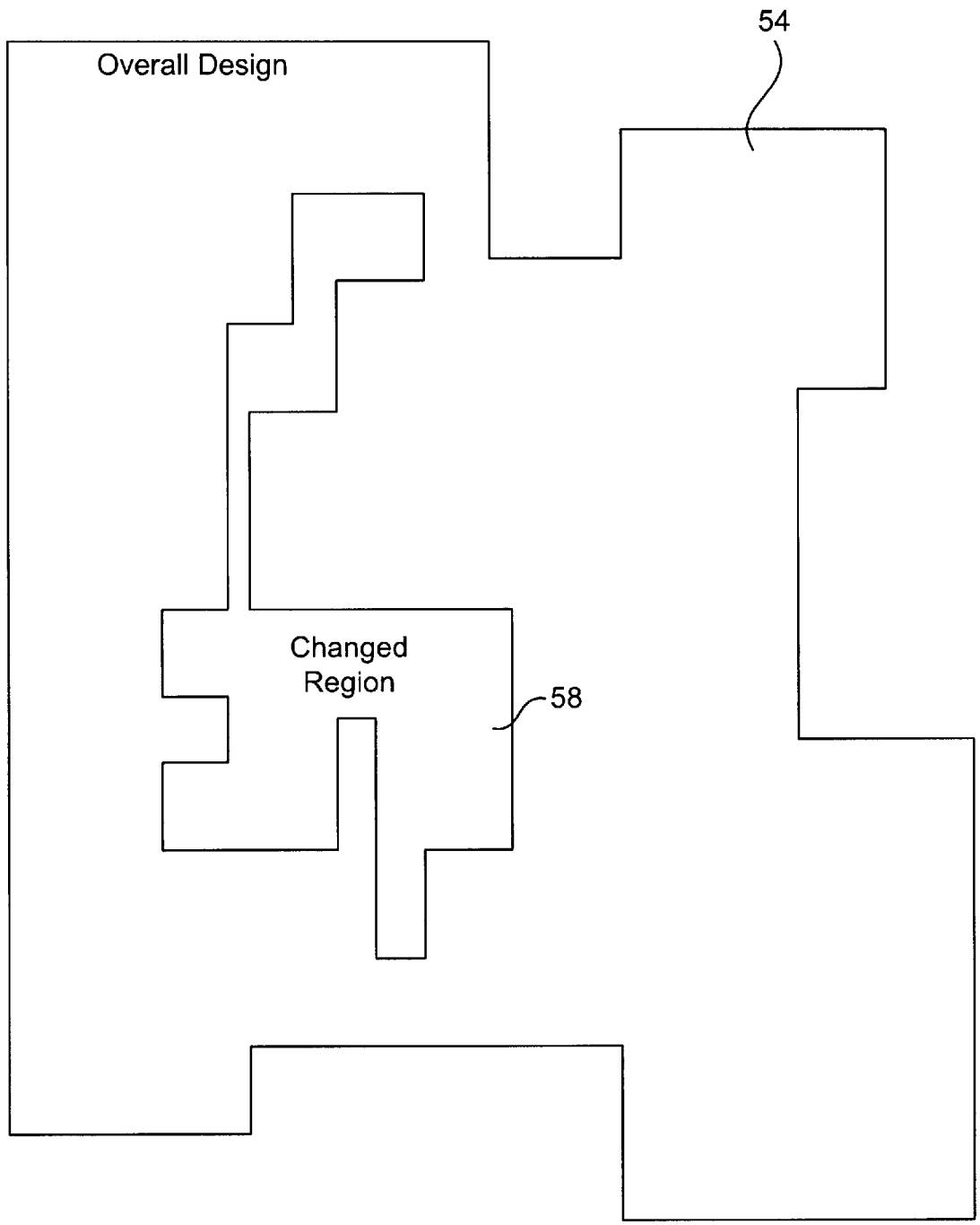
FIG. 1B is an idealized representation of an electronic design showing the boundaries of a changed region of that design within a larger unchanged region.

FIG. 1B presents a generic representation of an electronic design. An "overall design" 54 represents a complete electronic design for a given device or a substantially independent portion of that design. It may or may not subsume an entire target hardware device. Within overall design 54, there is a "changed region" 58 representing the portion of overall design 54 affected by a user's changes after full compilation. While FIG. 1B shows only a single changed region 58, it should be understood that overall design 54 may contain multiple changed regions.

It should also be understood that the changes actually made at the hands of the user may have been limited to a few gates representing a subsection of changed region 58. However, those changes may have a wider sphere of influence—directly affecting a more encompassing region delineated by the boundaries of changed region 58. It is the function of software algorithms such as the sub-netlist identification algorithm and netlist differencing to identify the boundaries of changed region 58.

FIG. 1B provides a conceptual tool. It may generally describe the state of affairs at various stages in the compilation procedure. For example, FIG. 1 may represent the electronic design prior to incremental recompilation, in which case, it represents a netlist for the electronic design. Alternatively, FIG. 1 may represent the arrangement of synthesized logic cells prior to placement on a target hardware device. Still further, FIG. 1 may represent the physical layout of logic elements that have been placed on the target hardware device. In all cases, changed region 58 should be made as small as possible to reduce the compiler's work on incremental recompile. This allows recompilation to be performed much faster than if the entire design 54 had to be compiled after each user change.

Figure 2:
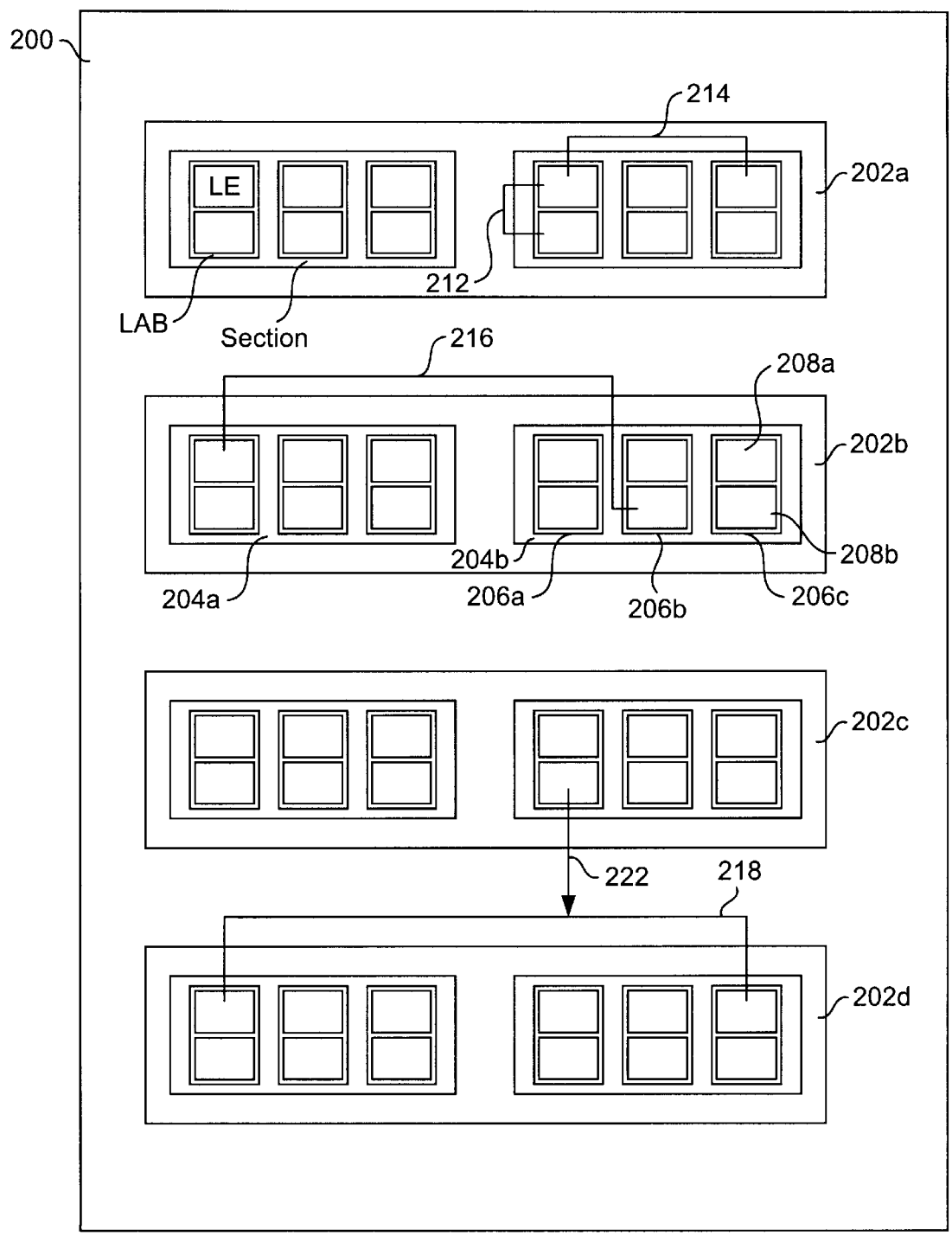
FIG. 2 is an idealized block representation of the architecture of an arbitrary hardware device, including interconnects.

The method of placing logic cells on available logic elements during incremental recompilation, in accordance with this invention, may be understood with reference to a hypothetical target hardware device having multiple hierarchical containment levels. Such a hardware device is represented in FIG. 2. This idealized representation generally conforms to the layout of a FLEX 10K programmable logic device available from Altera Corporation of San Jose, Calif. In FIG. 2, a programmable logic device 200 is segmented into a plurality of "rows" to facilitate interconnection between logic elements on a given row. In the hypothetical example shown, there are four rows: 202a, 202b, 202c, and 202d.

Each row of programmable logic device 200 is further subdivided into two "half-rows." For example, row 202b is shown to contain a half-row 204a and a half-row 204b. The next lower level of the containment hierarchy is the "logic array block" (LAB). Half-row 204b, for example, contains three LABs: an LAB 206a, an LAB 206b, and an LAB 206c. Finally, at the base of the of the containment hierarchy are several "logic elements." Each such logic element exists within a single logic array block. For example, LAB 206c includes two logic elements: a log element 208a and a logic element 208b.

In short, PLD 200 includes four levels of hierarchical containment: (1) rows, (2) half-rows, (3) LABs, and (4) logic elements. Any logic element within PLD 200 can be uniquely specified (and located) by specifying a value for each of these four levels of the containment hierarchy. For example, logic element 208b can be specified as follows: row (2), half-row (2), LAB (3), LE(2).

To fit a logic design onto a target hardware device such as that shown in FIG. 2, a synthesized netlist is divided into logic cells (typically containing one or more gates) which are placed in the various logic elements as uniquely defined above. Thus, each logic cell from the synthesized netlist resides in a unique single logic element.

Often, a multi-level containment hierarchy such as that shown in PLD 200 includes multiple levels of routing lines (interconnects). These connect the uniquely placed logic cells to complete circuits. In PLD 200, for example, four levels of interconnect are provided, one for each of the four containment hierarchy levels. First a local interconnect such as interconnect 212 is employed to connect two logic elements within the same LAB. At the next level, a LAB-to-LAB interconnect such as interconnect 214 is employed to connect two LABs within the same half-row. At the next higher level, a "global horizontal" interconnect is employed to connect logic elements lying in the same row but in different half-rows. An example of a global horizontal interconnect is interconnect 216 shown in row 202b. Another global horizontal interconnect is shown as interconnect 218, linking logic elements within row 202d. Finally, a "global vertical" interconnect is employed to link a logic element in one row with a logic element in a different row. For example, a global vertical interconnect 222 connects a logic element in the first LAB of the second half-row of row 202c to two separate logic elements in row 202d. In the embodiment shown, this is accomplished by providing global vertical interconnect 202 between the above-described logic element in row 202c to global horizontal interconnect 218 in row 202d. Consistent with the architecture of Altera Corporation's FLEX 10K CPLD, global vertical interconnects are directly coupled to the logic element transmitting a signal and indirectly coupled (through a global horizontal interconnect) to the logic elements receiving the transmitted signal.

In a target hardware device, there will be many paths available for routing a given signal line. During the routing stage, these various possible routing paths must be evaluated to determine which is best for the design being fit.

The interconnect structure and overall architecture of the Altera FLEX 10K family of PLDs is described in much greater detail in U.S. Pat. No. 5,550,782, issued on Aug. 27, 1996, naming Cliff et al. as inventors, and entitled "PROGRAMMABLE LOGIC ARRAY INTEGRATED CIRCUITS." That application is incorporated herein by reference for all purposes. Additional discussion of the FLEX 10K and other PLD products may be found in the Altera 1996 Data Book, available from Altera Corporation of San Jose, California. The Data Book is incorporated herein by reference for all purposes.

Briefly, in the FLEX 10K architecture, there are at least three rows, with two half-rows per row, and twelve LABs per half-row. Each LAB includes eight logic elements each of which, in turn, includes a 4-input look-up table, a programmable flipflop, and dedicated signal paths for carry and cascade functions. The eight logic elements in an LAB can be used to create medium-sized blocks of logic—such as 8-bit counters, address decoders, or state machines—or combined across LABs to create larger logic blocks.

It should be understood that the present invention is not limited to the Altera FLEX 10K architecture or any other hardware architecture for that matter. In fact, it is not even limited to programmable logic devices. It may be employed generically in target hardware devices as broadly defined above and preferably in application specific integrated circuit designs. PLDs are just one example of ASICs that can benefit from application of the present invention.

3. Placement of a Changed Design

The important feature of all these designs is that they contain multiple levels of containment hierarchy which represent constraints on the position assignments of logic elements. In a most constrained scenario, the placement of all logic cells outside of changed region 58 remains fixed on the target hardware device (e.g., device 200) during incremental recompile. In other words, the placement of unchanged logic cells (as mapped to particular logic elements on the hardware device during the initial full compile) remains fixed on incremental recompile. If changed region 58 of the electronic design can be fit on the electronic hardware device without relaxing this constraint, the incremental compile operation is extremely efficient. However, as explained below, sometimes the compiler will have to gradually relax one or more of the constraints to fit the changed region of overall design 54. As explained in more detail below, relaxing the constraints may allow a logic cell to shift between the logic elements within a given LAB during the incremental recompile.

In the most trivial case, a design change produces the same number and size of logic cells so that the mapping of logic cells to logic elements remains unchanged. This may occur when the design change causes a change only in the function of a look up table but not its number of inputs or outputs. Such changes could be handled without resort to the placement methods of this invention. In contrast, when a design change increases the number of gates or the size of gates, then the previous mapping of cells to elements may have to be adjusted. Similarly, if the design change causes the number of gate inputs and/or outputs to increase beyond the capacity of a given logic element, the logic cells may have to remapped. The procedures of this invention efficiently remap the changed logic cells to logic elements.

Figure 3:
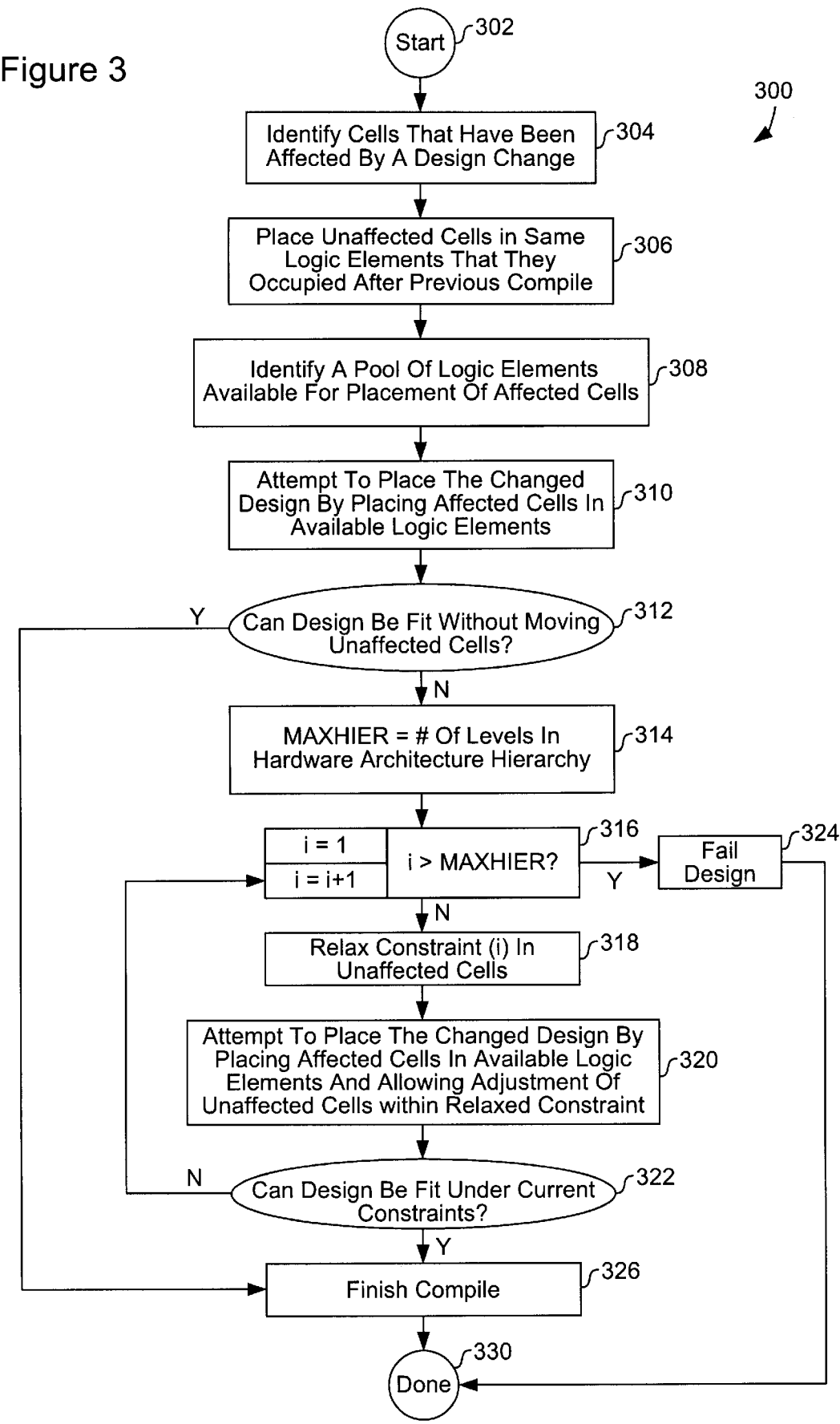
FIG. 3 is a process flow diagram illustrating some of the significant steps in an incremental recompilation procedure in accordance with one embodiment of the present invention.

The placement of logic cells on a target hardware device during incremental recompilation is detailed in the process flow diagram depicted in FIG. 3. It should be understood that this process flow diagram represents but one method for performing incremental recompilation in accordance with the invention. A recompile process 300 begins at 302 and then in a step 304 the compiler identifies those logic cells within a previously compiled design that have been affected by a user's subsequent design change. As explained, these "changed cells" may be represented as changed region 58 within overall design 54 of FIG. 1.

Next, the compiler places the logic cells that have been deemed to be unchanged from the previous full compile in the same logic elements of the target hardware device that they had occupied after the previous full compile. In other words, the logic cells within overall design 54 but outside of changed region 58 remain confined to their previous logic elements. This leaves a pool of logic elements available for placement of the changed logic cells. The compiler identifies such pool of available logic elements at a step 308. Generally, the pool of available logic elements includes two components. First, there are those logic elements which were not used in the previous full compile. These include logic elements in the hardware device that lie outside of overall design 54. The second type of available logic elements are those which were used to place the logic cells that have been changed as a result of the user's actions. These logic elements were mapped to changed region 58 of the electronic design in FIG. 1.

After the compiler has identified the pool of logic elements available to if for placement of the logic cells in changed region 58, it attempts to fit those changed cells by placing them in the previously identified available logic elements. This is represented at a step 310 in FIG. 3. One suitable technique for attempting this fit is described in U.S. Pat. No. 5,341,308, issued on Aug. 23, 1994, naming D. W. Mendel as inventor, and entitled "METHODS FOR ALLOCATING CIRCUIT ELEMENTS BETWEEN CIRCUIT GROUPS." That application is incorporated herein by reference for all purposes. In general, the fitting process employs heuristics that minimize the space occupied by the logic cells while allowing successful routing between logic elements and meeting the limits of timing, power consumption, etc.

Based upon these criteria, the compiler next determines at a decision step 312 whether the design can be successfully fit without moving the unchanged cells from their positions in the unchanged region of the hardware device. If the answer to this inquiry is affirmative, the incremental compilation is finished at a step 326 and the entire process is completed thereafter at 330.

If the changed design cannot be fit without moving the unaffected logic cells (i.e., decision step 312 is answered in the negative), then the compiler begins relaxing certain of the constraints on placement of the unchanged cells. First, at a step 314, the value of a variable MAXHIER is specified. This value represents the number of levels of containment in the hardware's architecture hierarchy. In the example of FIG. 2 there are four levels of containment. These levels are preferably, though not necessarily, relaxed one at a time, in series.

After the value of MAXHIER has been set at step 314, an incremental loop step 316 sets the value of an index i equal to one. It then determines whether the current value of i is greater than the value of MAXHIER. If not, the compiler relaxes a constraint (i) in the placement of the unaffected cells. This is represented at a process step 318. Following the process flow the first time through the loop controlled by step 316, constraint (i) is the first constraint in the containment hierarchy. In the example presented in FIG. 2, this would be the constraint on the placement of a logic cell within a particular logic element of an LAB. By relaxing this constraint, a logic cell that may have been initially placed in a first logic element of a given LAB may now be placed in a different logic element of that same LAB. For example, a logic cell representing a multiplexer may have originally been placed in logic element 208b of FIG. 2. At step 310 of process 300, that logic cell would be constrained to remain at logic element 208b. However, by relaxing the logic element constraint at step 318, the multiplexer logic cell is allowed to be placed in either logic element 208a or logic element 208b.

After a constraint has been relaxed at step 318, the compiler attempts to fit the changed design by placing the changed logic cells in the available logic elements while allowing adjustment of the unchanged logic cells within the confines of the relaxed constraint(s). This attempt is made at a process step 320. Generally, the same fitting heuristics employed in process step 310 may be employed in process step 320.

Next, the compiler determines whether the changed design can be fit under the current constraints at a decision step 322. In other words, the compiler determines whether the fit attempted at step 320 was successful. If so, process control is directed to step 326 where the compilation is finished and the process is thereafter completed at 330. If, on the other hand, the changed electronic design cannot be fit under the current set of constraints (i.e., decision step 322 is answered in the negative), process control is directed back to iterative loop step 316 where the index i is incremented by one. Again, step 316 determines whether the current value of i now exceeds the value of MAXHIER. If not, process control directs the compiler to perform process step 318 once again. This time, a second level constraint is relaxed. In the example presented in FIG. 2, this allows logic cells to be mapped within any logic element in a given half-row of PLD 200. Note that in the previous iteration, the cell could only be moved about within its original LAB.

After the next constraint has been relaxed, the compiler again attempts to fit the changed design while taking advantage of the newly relaxed constraint at step 320 and then determines whether the design can in fact be fit under the current set of constraints at decision step 322. If not, the compiler again loops back to iterative loop step 316 where the value of i is incremented to three. At this point, (again following the example of FIG. 2) the constraints on placements within a half-row are relaxed at step 318. The system then attempts to fit the changed design within these newly relaxed constraints at step 320 and determines whether the design can be fit under the set of constraints at decision step 322. If the changed design now fits, the process of compilation is completed at steps 326 and 330. If not, the compiler once again loops back to step 316 where the value of i is incremented to four. This essentially allows a full compile within the example of FIG. 2. That is, any unchanged logic cell (within overall design 54 and outside of changed region 58) can be moved to any logic element within a target hardware device. If this design can be fit, the process is completed as described as above. If it cannot, the value of i now reaches five which is greater than the value of MAXHIER (for the example of FIG. 2). If this is the case, the changed design can not be fit on the target hardware device. Within FIG. 3, this is represented as an affirmative outcome to the decision posed in step 316. As a result, the compiler "fails" the design at a process step 324. This step may be accompanied by notifying the designer that the currently presented design cannot be fit on the target hardware device. Thus, the user may be encouraged to further modify his or her design or attempt to fit it on a different (e.g., larger) target device.

It should be apparent from the above description of process 300, that the present invention allows a very gradual relaxation in constraints. The most efficient recompilation will occur while maintaining the maximum constraints. This is the scenario posed at step 310. The least efficient recompilation is a full compile operation. This occurs when the value of i is equal to MAXHIER. At that point, any logic cell can be placed on any logic element of the target hardware device. The beauty of this approach is that initially the compiler attempts the incremental recompile in a manner that would be most efficient. If this does not work, it tries the next most efficient approach to recompilation. And if the design still cannot be fit, it moves to the next most efficient recompilation procedure, and so on. Ultimately, in an attempt to do whatever it can to fit the change design, the compiler resorts to a full compilation process. Thus, in the end, the compiler may pull out all the stops in an attempt to compile the user's changed design.

Again, it should be remembered that the processes of this invention may be applied to target hardware devices having any number of levels of containment in their hierarchy. The value of MAXHIER will be chosen to reflect this variability.

As indicated at step 304, it is necessary that the compiler first identify those logic cells that have been affected by the user's changes to the design (i.e., "changed cells"). As mentioned, various approaches may be employed to delineating the boundaries within which the changed logic cells reside.

Figure 4A:
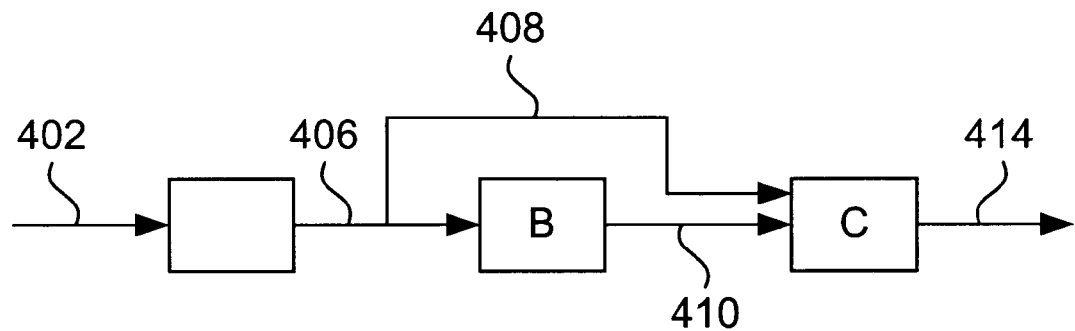
FIGS. 4A and 4B are hypothetical gate-level representations of a logic segment showing how that segment changes between an original electronic design and a changed electronic design.
Figure 4B:
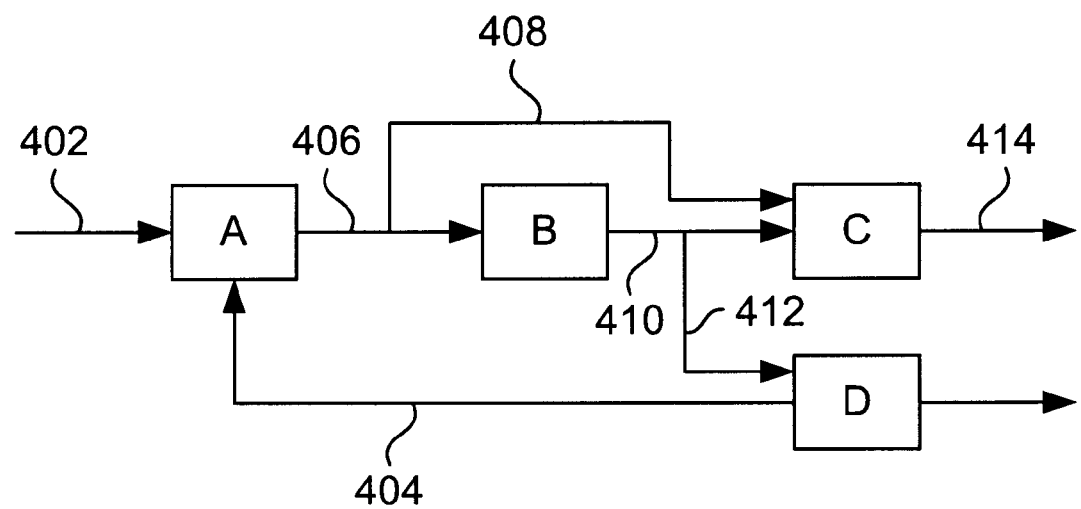

In one preferred embodiment, the changed cells identified in process step 304 include those whose fan-outs or fan-ins have been changed or those cells which are new to the electronic design. These cases are represented in FIGS. 4A and 4B. FIG. 4A represents an arrangement of logic cells after the initial full compilation has been performed. It includes logic cells A, B, and C. FIG. 4B represents the same logic block as in FIG. 4A but after incremental recompilation is initiated.

Logic cell A is an example of a logic cell whose fan-in has changed. Initially, in FIG. 4A, the fan-in for logic cell A included only a line 402. After the netlist for the changed design has been generated, the fan-in for logic cell A includes both line 402 and a new line 404 as illustrated in FIG. 4B. The fan-ins for logic cells B and C do not change during incremental recompilation. As shown in both FIGS. 4A and 4B, the fan-in for logic cell B includes only a line 406. And in both FIGS. 4A and 4B the fan-in for logic cell C includes only a line 408 and a line 410.

An example of a logic cell whose fan-out has changed is logic cell B. Initially, after the first full compile (as shown in FIG. 4A), the fan-out for logic cell B included only line 410. After the netlist has been produced for the changed design (see FIG. 4B), the fan-out of logic cell B includes a line 412 in addition to line 410. Note that the fan-outs for logic cells A and C do not change at incremental recompilation. Specifically, the fan-out for logic cell A includes lines 406 and 408. And the fan-out for logic cell C includes only a line 414 in both FIGS. 4A and 4B.

Finally, a logic cell D appears for the first time at incremental recompilation as shown in FIG. 4B. Because it is a new cell it is considered a "changed cell" for purposes of identifying cells that have been affected by a design change in process step 304.

In summary, FIGS. 4A and 4B illustrate three types of changed logic cells. These include logic cells whose fan-ins have changed (logic cell A). They also include logic cells whose fan-outs have changes (e.g., logic cell B). Finally, the changed logic cells include a new logic cell such as logic cell D shown in FIG. 4B. Note that in this example, logic cell C would not be considered a changed logic cell because it is not a new cell and neither its fan-in nor its fan-out have changed.

Tying the example of FIGS. 4A and 4B into the example of FIG. 1, logic cells A, B and D would reside within changed region 58. In contrast, logic cell C would reside outside of changed region 58 but within overall design region 54.

Figure 5:
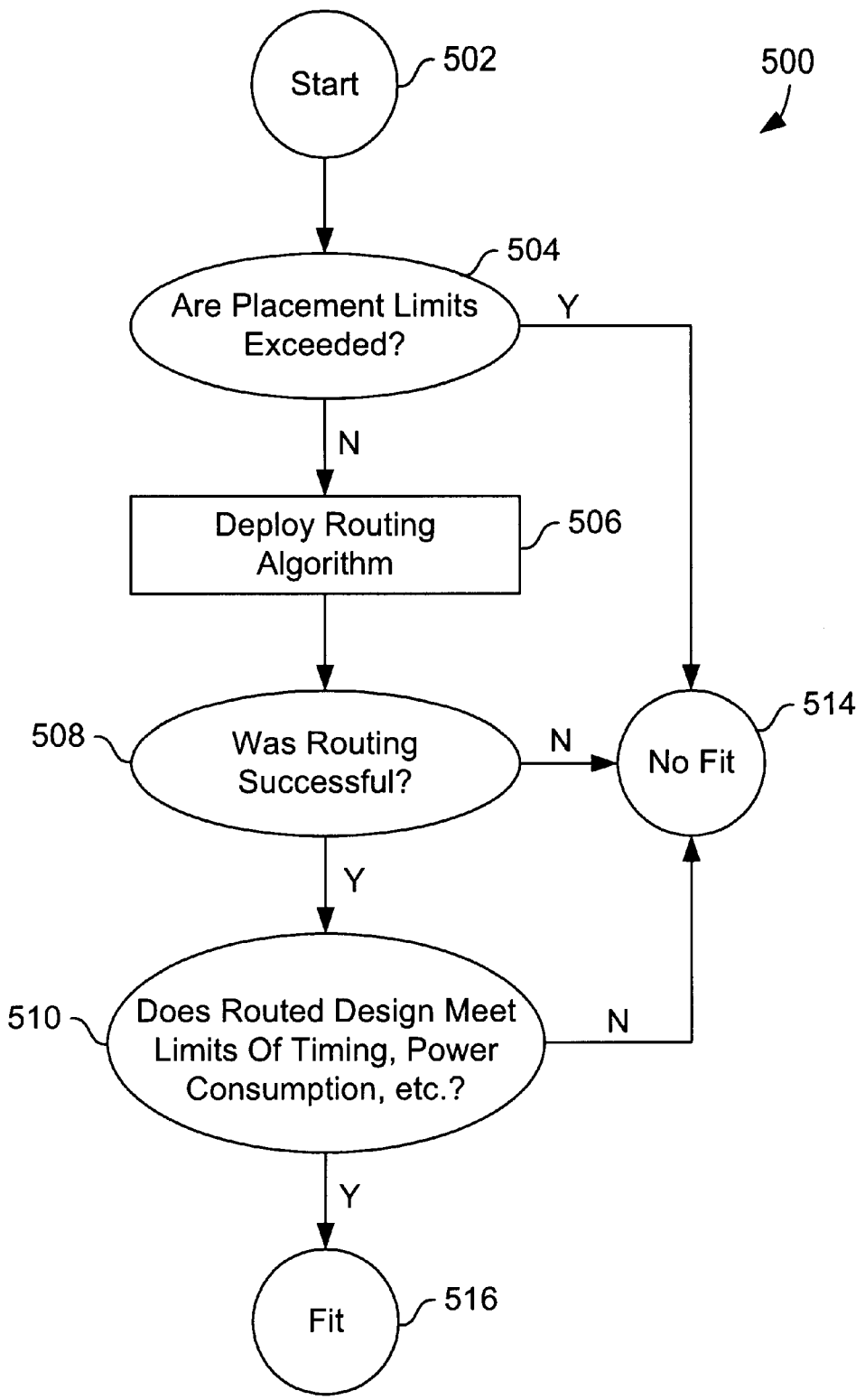
FIG. 5 is a process flow diagram depicting some of the significant steps in a routine for fitting an electronic design or a portion of an electronic design in accordance with one embodiment of this invention.

The process of determining whether a given design can be fit within the existing constraints (e.g., decision steps 312 and 322 of FIG. 3) involve determining whether certain standard design criteria have been met. In one example, a process 500 depicted in FIG. 5 illustrates how such determination may be made. It should be remembered when reading the following description that this invention focuses on placement of changed cells during incremental recompilation, and is not particularly concerned with the routing algorithm employed to link the various logic elements in which the changed design has been placed.

Now with reference to FIG. 5, process 500 begins at 502 and then in a decision step 504 the compiler determines whether the placement limits have been exceeded. This involves, for example, determining whether all logic cells can be fit within the available logic elements identified at step 308.

If the compiler determines that the placement limits have been exceeded, there can be no fit of the design under the current constraint. This is indicated by having process control go to end point 514. If, on the other hand, the compiler determines that the placement limits have not been exceeded, it then deploys the appropriate routing algorithm at a process step 506. Appropriate routing algorithms for programmable logic devices and other electronic designs are known to those of skill in the art. One suitable routing algorithm is described in R. R. Suaris and G. Kedem, "A quadrisection-based combined place and route scheme for standard cells" IEEE Transactions on CAD of Integrated Circuits and Systems, CAD-8(3):234–244, 1989. That reference is incorporated herein by reference for all purposes. In the simple case, without relaxation of constraints, the inputs and outputs of the changed portion of the electronic design netlist can be treated as I/O ports. Once the changed portion of the netlist has been synthesized (the point at which it may be subject to the methods of this invention), the resulting "changed" logic elements can be substituted back into the original network of logic elements—connecting the I/O ports of the changed region of the hardware device to the external wires of the unchanged region of the hardware device.

After the compiler deploys the routing algorithm, it determines whether the routing was successfully completed at a decision step 508. If the routing algorithm could not successfully route the newly placed design, the compiler determines that no fit is possible at end point 514. If, on the other hand, the compiler determines that the routing was in fact successful, it next determines whether the routed design meets additional design criteria such as timing limitations and power consumption limitations. This is indicated at a decision step 510. If any of these criteria are not met, not fit is possible as indicated by the arrow to end point 514. If, on the other hand, decision step 510 is answered in the affirmative, it is clear that the current design can be fit within the existing constraints as indicated by the arrow to end point 516.

Relaxation of various constraints and attempts to place a change design within the context of these relaxed constraints (see steps 318 and 320 of FIG. 3) will now be further illustrated with reference to FIG. 6. FIG. 6 again presents the idealized hierarchical containment architecture depicted in FIG. 2. It includes logic elements as the most basic unit of architecture. Logic elements area grouped together within LABs, which are in turn grouped within half-rows. The half-rows are grouped within rows of the larger electronic design.

The initial constraint to be relaxed (i=1) is the logic element constraint. When this constraint is relaxed, logic cells in an unchanged portion of the electronic design can be placed in any logic element within their initial LAB. That LAB is the LAB in which they had been placed after the initial full compilation. While this constraint is relaxed, a logic cell cannot be moved to a different logic element outside of its initial LAB. Referring to FIG. 6, when the logic element constraint is relaxed, a logic cell (e.g., a multiplexer) placed in logic element 208a after full compilation may now be moved to logic element 208b during incremental recompilation. However, it may not be moved to logic element 210a in adjacent LAB 206b, or any other logic element for that matter. A logic cell initially placed in logic element 210a of LAB 206b can be moved to any other logic element within 206b during incremental recompile.

If the compile determines that the changed design cannot be fit even after the logic element constraint is relaxed, the process of this invention will allow the LAB constraint to be relaxed. When this occurs, a logic cell of an unchanged portion of the electronic design can shift to any position within the half-row in which it originally resided. But it cannot move to a logic element in a different half-row. Thus, for example, a logic cell (e.g., a multiple input NAND gate) originally placed in the logic element 212a within a half-row 216b may be moved to any other logic element within half-row 216b. For example, the logic cell is shown to move from logic element 212a to a logic element 214a. Note that this shifting takes place between different LABs. During this second level of constraint relaxation, a logic cell originally placed in logic element 212a could not be moved to a logic element 218b located in an adjacent half-row 216a.

Assuming now that the third level of constraint has been relaxed, logic cells in the unchanged portion of the design are free to move between half-rows but not rows. For example, a logic cell originally placed in logic element 220b can now, on incremental recompile, be moved to either logic element 218a or 218b, for example. This is because logic elements 220b, 218a, and 218b all reside in the same row, row 202c. However, at this half-row level of constraint relaxation, the logic cell originally placed in logic element 220b could not now be shifted to logic element 208a or any other logic element outside of row 202c.

Figure 6:
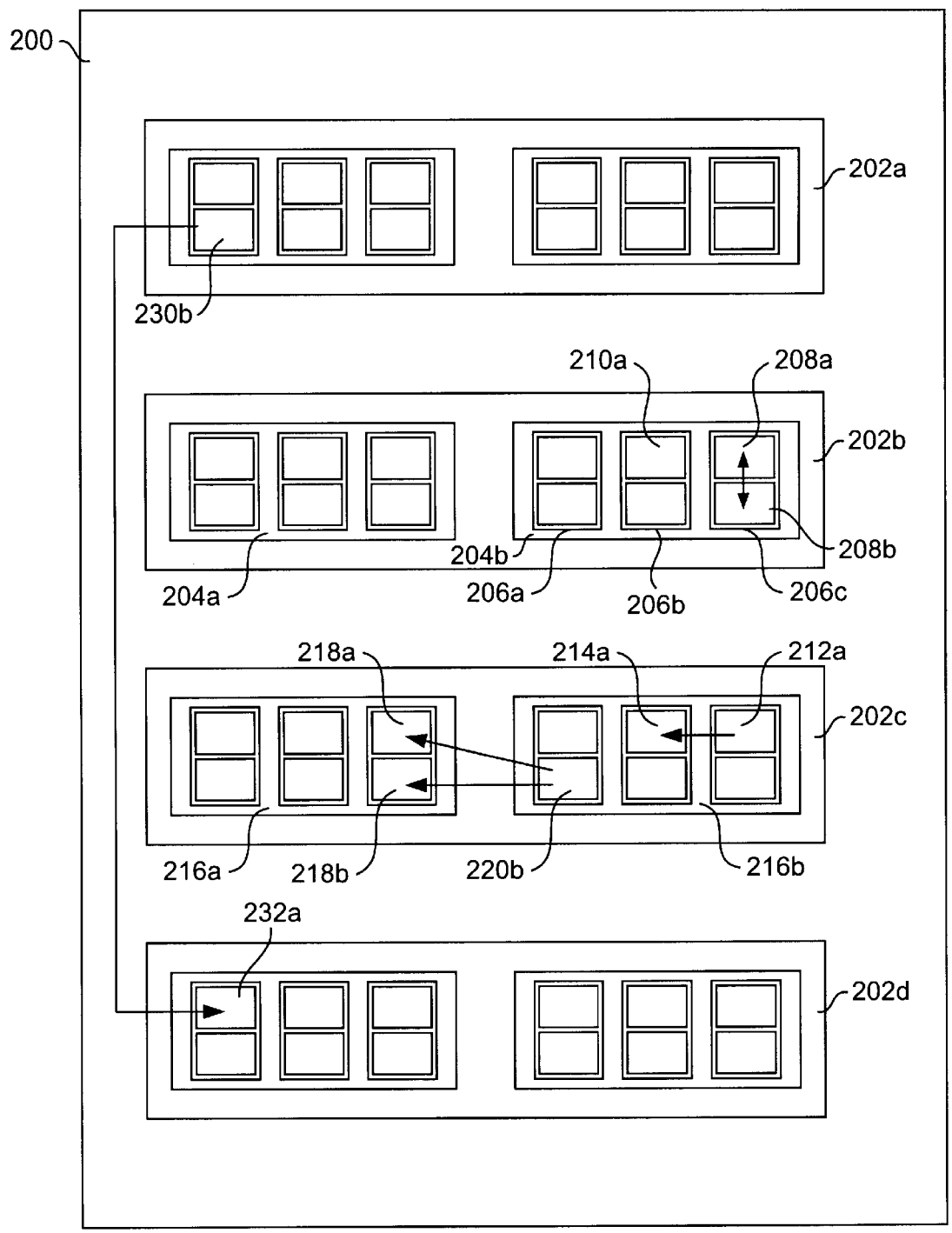
FIG. 6 is a hypothetical block representation of a target hardware device and illustrating how logic cells may be shifted between related logic elements during relaxation of certain constraints employed during the fitting procedures of this invention.

Finally, the last possible constraint to be relaxed in the design of FIG. 6 is the row constraint. When this constraint is relaxed, a logic cell from the unchanged portion of the electronic design can be moved anywhere, in any row, of target hardware device 200. Thus, for example, a logic cell initially placed in a logic element 230b (row 202a) may now be shifted to a logic element 232a in row 202d in order to facilitate placing the overall changed design. When this overall constraint has been relaxed, the compiler is essentially allowed to perform a full compilation without any constraints. Obviously, this is not the most efficient way to proceed. However, if no other more efficient way of compiling the design is found, the compiler may resort to this full compilation procedure.

Note that the unchanged portion may be allowed to slide into the changed region of the hardware device during relaxation of the constraints. For example, if the boundary between the changed and the unchanged regions passes between adjacent logic elements in a given LAB, a logic cell from the unchanged portion of the design can move across this boundary during relaxation of the logic element constraint.

In some design environments, a user may control the fit of design by assigning logic to a particular pin or logic cell. In addition, some environments allow assignment of a group of logic functions to a single, named unit, called a "clique." If such user assignments affect a changed portion of an electronic design, then those assignments may be treated as constraints which can not be relaxed at any stage in the above methodologies. In one alternative embodiment, the user fitting constraints may be relaxed as a last resort—after the highest level hierarchical containment constraint is relaxed.

4. Computer System Embodiment

Embodiments of the present invention as described above employ various process steps involving data stored in computed systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms such as identifying, fitting, or comparing. In any of the operations described herein that form part of the present invention these operations are machine operations. Useful machines for performing the operations of embodiments of the present invention include general purpose digital computers or other similar devices. In all cases, there should be borne in mind the distinction between the method of operations in operating a computer and the method of computation itself. Embodiments of the present invention relate to method steps for operating a computer in processing electrical or other physical signals to generate other desired physical signals.

Embodiments of the present invention also relate to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, embodiments of the present invention further relate to computer readable media that include program instructions for performing various computer-implemented operations. The media and program instructions may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 7:
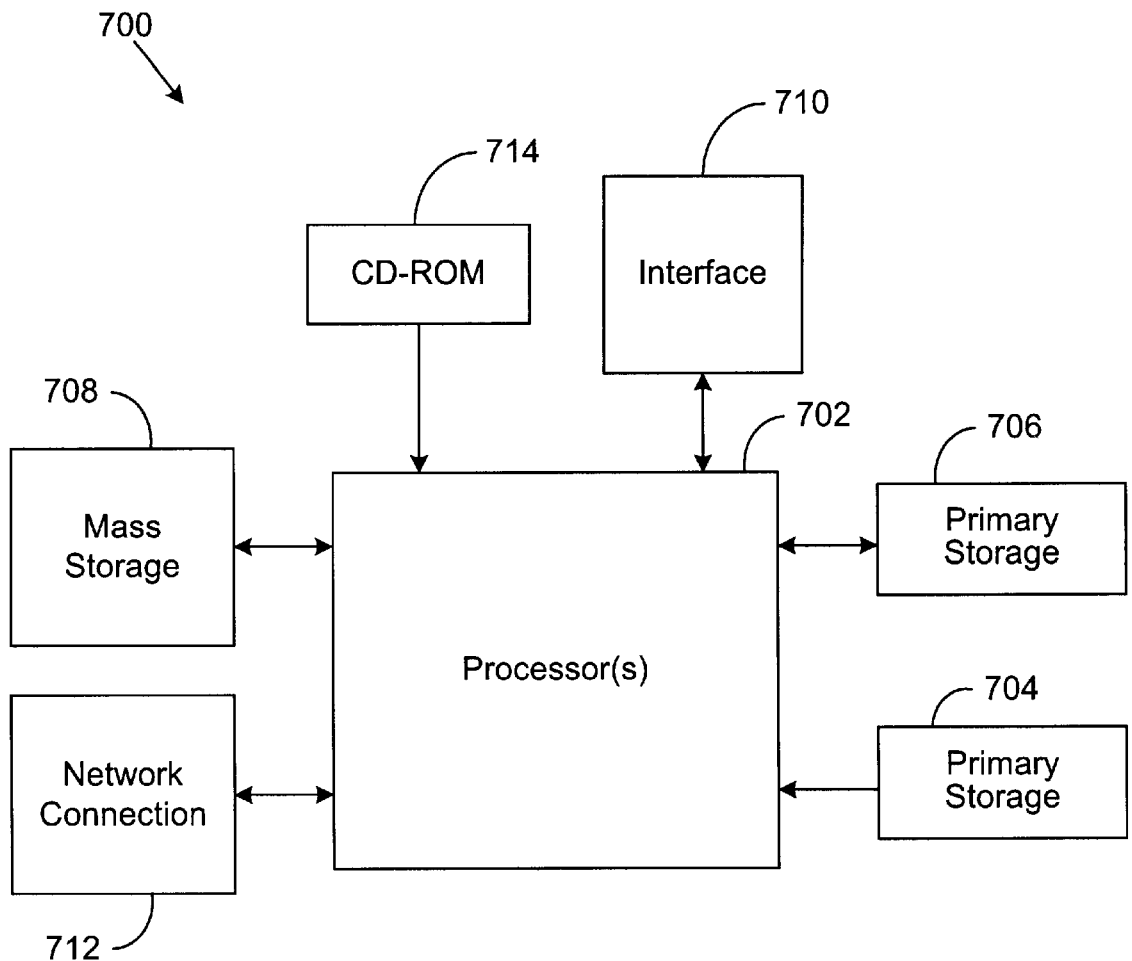
FIG. 7 is a block diagram of a typical computer system suitable for implementing an embodiment of the present invention.

FIG. 7 illustrates a typical computer system in accordance with an embodiment of the present invention. The computer system 700 includes any number of processors 702 (also referred to as central processing units, or CPUs) that are coupled to storage devices including primary storage 706 (typically a random access memory, or RAM), primary storage 704 (typically a read only memory, or ROM). As is well known in the art, primary storage 704 acts to transfer data and instructions uni-directionally to the CPU and primary storage 706 is used typically to transfer data and instructions in a bi-directional manner. Both of these primary storage devices may include any suitable of the computer-readable media described above. A mass storage device 708 is also coupled bi-directionally to CPU 702 and provides additional data storage capacity and may include any of the computer-readable media described above. The mass storage device 708 may be used to store programs, data and the like and is typically a secondary storage medium such as a hard disk that is slower than primary storage. It will be appreciated that the information retained within the mass storage device 708, may, in appropriate cases, be incorporated in standard fashion as part of primary storage 706 as virtual memory. A specific mass storage device such as a CD-ROM 714 may also pass data uni-directionally to the CPU.

CPU 702 is also coupled to an interface 710 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 702 optionally may be coupled to a computer or telecommunications network using a network connection as shown generally at 712. With such a network connection, it is contemplated that the CPU might receive information from the network, or might output information to the network in the course of performing the above-described method steps. The above-described devices and materials will be familiar to those of skill in the computer hardware and software arts.

Figure 8:
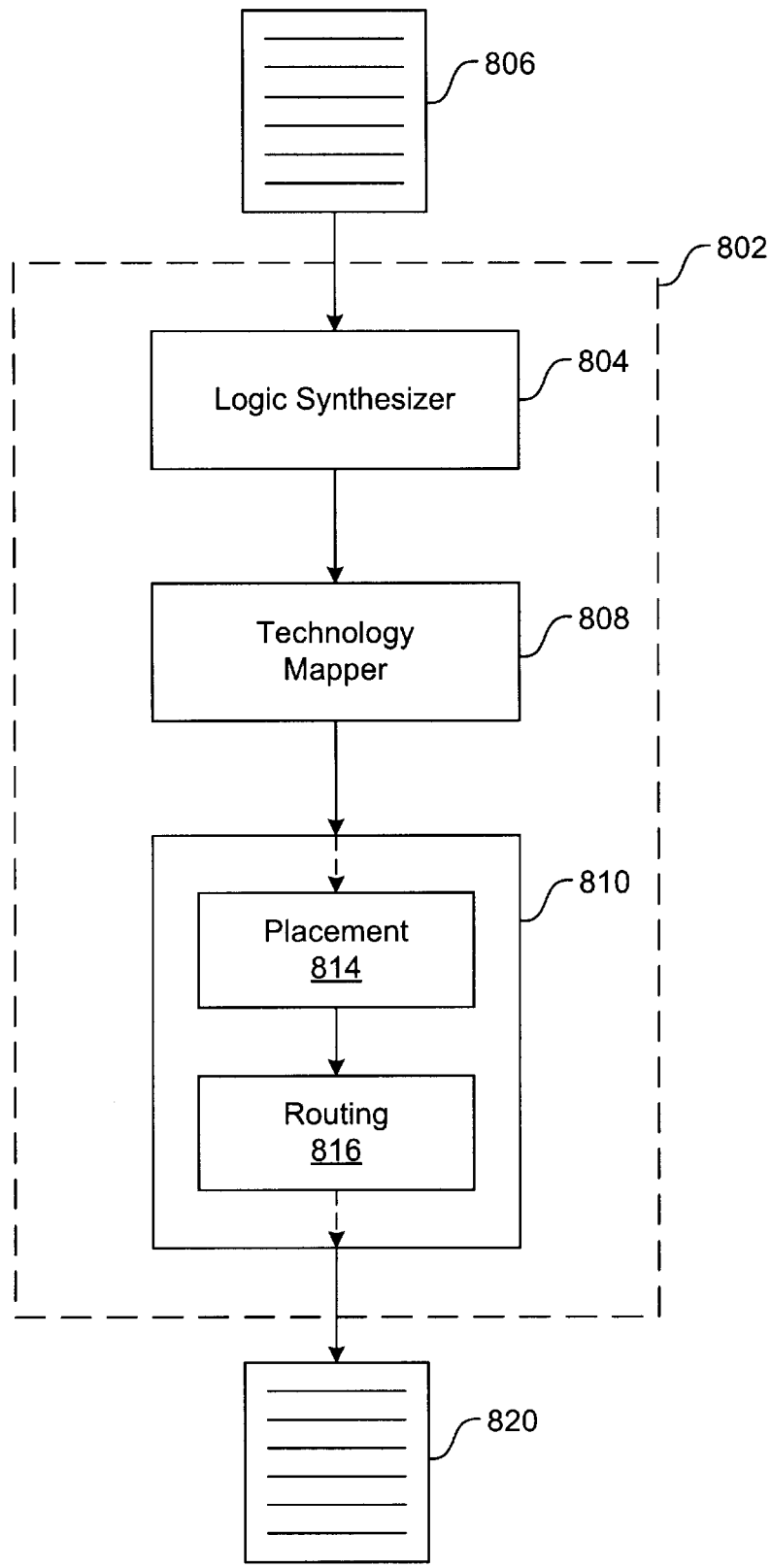
FIG. 8 is a block diagram showing modules that may be employed in a PLD design compiler of this invention.

The hardware elements described above may implement the instructions of multiple software modules for performing the operations of this invention. For example, instructions for running a compiler may be stored on mass storage device 708 or 714 and executed on CPU 708 in conjunction with primary memory 706. In a preferred embodiment, the compiler is divided into software submodules. Referring to FIG. 8, a compiler 802 includes a logic synthesizer 804 which creates a synthesized netlist from a user's high level electronic design 806. Compiler 802 also includes a technology mapper 808 which maps gates from the synthesized netlist into logic cells. Finally, compiler 802 includes a place and route module 810 which in turn includes a placement module 814 and a routing module 816. Placement module 814 places logic cells onto specific logic elements of a target hardware device. Routing module 816 connects wires between the inputs and outputs of the various logic elements in accordance with the logic required to implement the electronic design. Compiler 802 outputs a compiled design 820. It should be understood that other compiler designs may be employed with this invention. For example, some compilers will include a partitioning module to partition a technology mapped design onto multiple hardware entities. In addition, the compiler may be adapted to handle hierarchical designs, whereby synthesis, mapping, etc. are performed recursively as the compiler moves down branches of a hierarchy tree. Additional details of compiler software for PLDs may be found in U.S. patent application Ser. No. 08/958,670, naming D. Mendel as inventor, and entitled "PARALLEL PROCESSING FOR COMPUTER ASSISTED DESIGN OF ELECTRONIC DEVICES."

Figure 9:
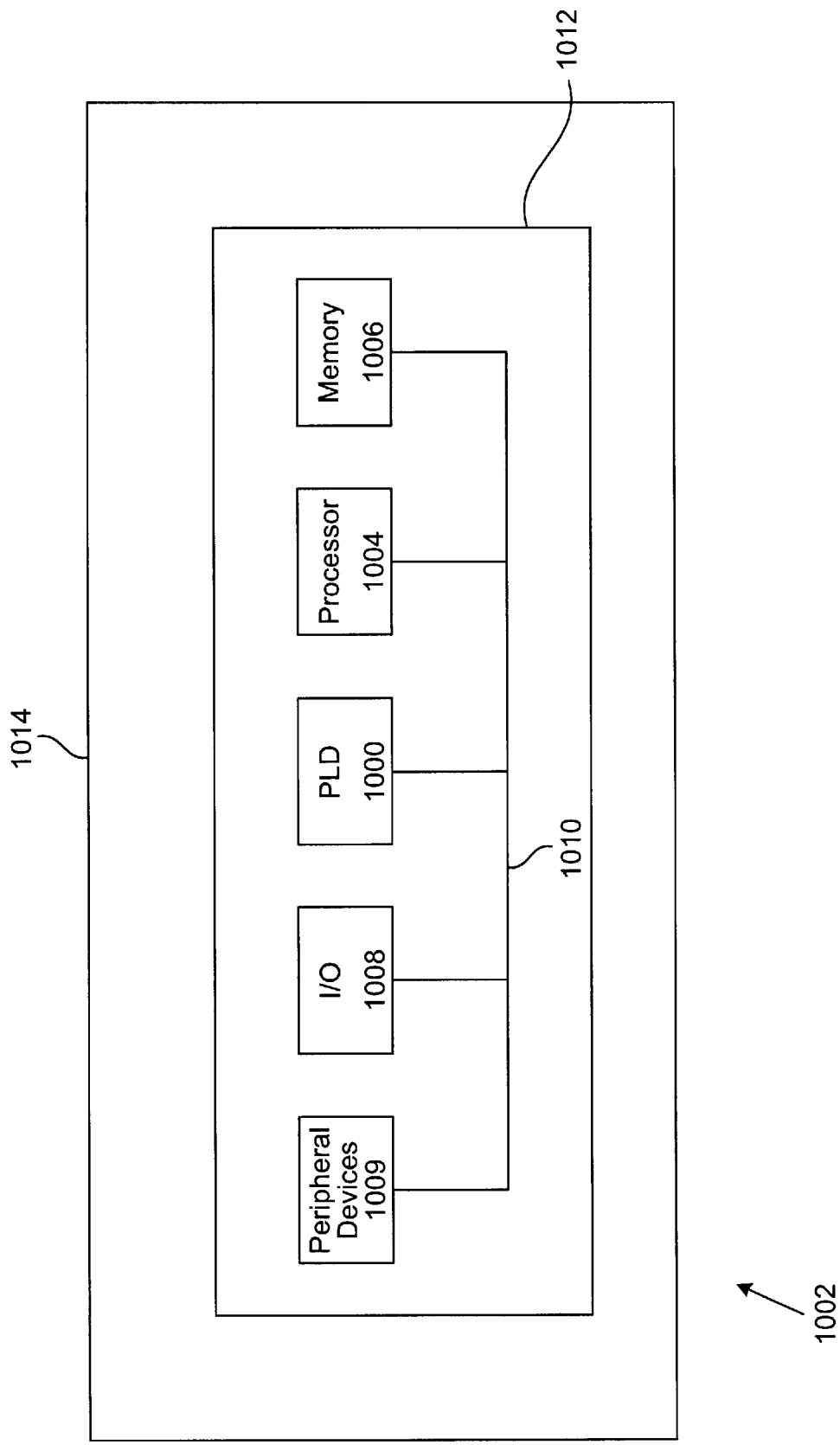
FIG. 9 is a block diagram depicting a system containing a PLD prepared in accordance with this invention.

This invention also relates to programmable logic devices programmed with a design prepared in accordance with the above described methods. The invention further relates to systems employing such programmable logic devices. FIG. 9 illustrates a PLD 1000 of the present invention in a data processing system 1002. The data processing system 1002 may include one or more of the following components: a processor 1004; memory 1006; I/O circuitry 1008; and peripheral devices 1009. These components are coupled together by a system bus 1010 and are populated on a circuit board 1012 which is contained in an end-user system 1014.

The system 1002 can be used in a wide variety of applications, such as computer networking, data networking, instrumentation, video processing, digital signal processing, or any other application where the advantage of using reprogrammable logic is desirable. The PLD 1000 can be used to perform a variety of different logic functions. For example, PLD 1000 can be configured as a processor or controller that works in cooperation with processor 1004. The PLD 1000 may also be used as an arbiter for arbitrating access to a shared resource in the system 1002. In yet another example, the PLD 1000 can be configured as an interface between the processor 1004 and one of the other components in the system 1002. It should be noted that the system 1002 is only exemplary, and that the true scope and spirit of the invention should be indicated by the following claims.

The foregoing describes the instant invention and its presently preferred embodiments. Numerous modifications and variations in the practice of this invention are expected to occur to those skilled in the art. For instance, the present invention may be implemented on one computer having one processor, on one computer having multiple processors, on different computers, and may take the form of instructions transmitted via a network connection such as an intranet or internet. In addition, the technique and system of the present invention is suitable for use with a wide variety of EDA tools and methodologies for programming a device. Therefore, the described embodiments should be taken as illustrative and not restrictive, and the invention should not be limited to the details given herein but should be defined by the following claims and their full scope of equivalents.

What is claimed is:

1. In a compiler for fitting electronic designs on target hardware devices, which devices have multiple levels of hierarchical containment together defining placement of logic from the electronic designs onto the target hardware devices, a method of fitting a changed electronic design which is changed from an original electronic design that was previously compiled, the changed electronic design including an unchanged portion which is unchanged from the original electronic design and a changed portion which is changed from the original electronic design, the method comprising:

(a) providing the unchanged portion of the changed electronic design on an unchanged region of a target hardware device on which the unchanged portion of the original electronic design was placed during the previous compilation;

(b) specifying one or more levels of hierarchical containment to relax; and (c) attempting to place the changed electronic design on the target hardware device while allowing the unchanged portion of the changed electronic design to change its placement within the unchanged region of the target hardware device but only insofar as permitted within the specified one or more hierarchical containment levels.

2. The method of claim 1, wherein the original electronic design and the changed electronic design are provided as netlists including logic cells comprising gates and nets, each logic cell being placed in a logic element of the target hardware device.

3. The method of claim 2, wherein at least two of the hierarchical containment levels are a logic element level and a logic array block level, which logic array block level comprises logic array blocks, each of which comprise multiple logic elements, and wherein (b) requires relaxing the logic element level, whereby a logic cell from within the changed portion is permitted to be placed, during (c), in any logic element within the logic array block in which it was placed during the previous compilation.

4. A programmable logic device containing logic cells fit according to the method of claim 3.

5. The method of claim 1, further comprising:

(d) determining whether the changed electronic design has been successfully fit in the target hardware device.

6. The method of claim 5, further comprising repeating (b), (c), and (d), with at least one additional constraint being relaxed each time that (b) is performed, until it is determined that either (i) the changed electronic design has been successfully fit in the target hardware device or (ii) the changed electronic design can not be fit in the target hardware device.

7. The method of claim 1, wherein the changed portion of the changed electronic design includes a logic cell whose fan-in or fan-out has changed.

8. The method of claim 1, wherein the changed portion of the changed electronic design includes a logic cell that was not present in the original electronic design.

9. The method of claim 1, wherein attempting to fit the changed electronic design comprises placing logic cells of changed electronic design on the target hardware device and routing lines therebetween.

10. The method of claim 1, wherein the target hardware device is an Application Specific Integrated Circuit.

11. The method of claim 10, wherein the target hardware device is a Programmable Logic Device.

12. The method of claim 1, wherein there are at least three levels of hierarchy containment.

13. The method of claim 12, wherein there are four levels of hierarchy containment.

14. A programmable logic device containing logic cells fit according to the method of claim 1.

15. The method of claim 1, further comprising, prior to (b), attempting to fit the changed electronic design on the target hardware device while holding the unchanged portion of the electronic design fixed on the unchanged region of the target hardware device, and without allowing reorganization of the unchanged portion of the electronic design within the unchanged region of the target hardware device.

16. A machine readable medium containing instructions for operating a compiler that fits electronic designs on target hardware devices, which devices have multiple levels of hierarchical containment together defining placement of logic from the electronic designs onto the target hardware devices, the instructions controlling fitting of a changed electronic design which is changed from an original electronic design that was previously compiled, the changed electronic design including an unchanged portion which is unchanged from the original electronic design and a changed portion which is changed from the original electronic design, the instructions specifying operations comprising:

(a) providing the unchanged portion of the changed electronic design on an unchanged region of a target hardware device on which the unchanged portion of the original electronic design was placed during the previous compilation;

(b) specifying one or more levels of hierarchical containment to relax; and (c) attempting to place the changed electronic design on the target hardware device while allowing the unchanged portion of the changed electronic design to change its placement within the unchanged region of the target hardware device but only insofar as permitted within the specified one or more hierarchical containment levels.

17. The machine readable medium of claim 16, further comprising instructions executed prior to (b), and specifying:

attempting to fit the changed electronic design on the target hardware device while holding the unchanged portion of the electronic design fixed on the unchanged region of the target hardware device, and without allowing reorganization of the unchanged portion of the electronic design within the unchanged region of the target hardware device.

18. The machine readable medium of claim 16, further comprising instructions for:

(d) determining whether the changed electronic design has been successfully fit in the target hardware device.

19. The machine readable medium of claim 18, further comprising instructions for repeating (b), (c), and (d), with at least one additional constraint being relaxed each time that (b) is performed, until it is determined that either (i) the changed electronic design has been successfully fit in the target hardware device or (ii) the changed electronic design can not be fit in the target hardware device.

20. The machine readable medium of claim 16, wherein the instructions for attempting to fit the changed electronic design specify placing logic cells of changed electronic design on the target hardware device and routing lines therebetween.

21. In a compiler for fitting electronic designs on target hardware devices, which devices have multiple levels of hierarchical containment together defining placement of logic from the electronic designs onto the target hardware devices, a method of fitting a changed electronic design which is changed from an original electronic design that was previously compiled, the changed electronic design including an unchanged portion which is unchanged from the original electronic design and a changed portion which is changed from the original electronic design, the method comprising:

(a) identifying an unchanged region of a target hardware device on which the unchanged portion of the original electronic design was fit during the previous compilation;

(b) attempting to fit the changed electronic design on the target hardware device while holding the unchanged portion of the electronic design fixed on the unchanged region of the target hardware device;

(c) determining whether the changed electronic design has been successfully fit in the target hardware device; and (d) if it has been determined that the changed electronic design has not been successfully fit in the target hardware device, identifying one or more levels of hierarchical containment to relax and attempting to fit the changed electronic design on the target hardware device while allowing the unchanged portion of the changed electronic design to shift within the unchanged region of the target hardware device on which the unchanged portion of the original electronic design was placed in the compiled original design but only insofar as permitted within the identified one or more hierarchical containment levels.

22. A programmable logic device containing logic cells fit according to the method of claim 21.

23. The method of claim 21, wherein the original electronic design and the changed electronic design are provided as netlists including cells comprising gates and nets, each cell being placed in a logic element of the target hardware device.

24. The method of claim 21, wherein the changed portion of the changed electronic design includes a logic cell whose fan-in or fan-out has changed or a logic cell that was not present in the original electronic design.

25. The method of claim 21, wherein the target hardware device is a Programmable Logic Device.

26. In a compiler for fitting an electronic design on a target hardware device, a method of fitting a changed electronic design which is changed from an original electronic design that was previously compiled, the changed electronic design including an unchanged portion which is unchanged from the original electronic design and a changed portion which is changed from the original electronic design, wherein the target hardware device has multiple levels of hierarchical containment together defining placement of logic from the changed electronic design onto the target hardware device, the method comprising:

(a) identifying an unchanged region of a target hardware device on which the unchanged portion of the original electronic design was fit during the previous compilation;

(b) attempting to fit the changed electronic design on the target hardware device while holding the unchanged portion of the electronic design fixed on the unchanged region of the target hardware device;

(c) determining whether the changed electronic design has been successfully fit in the target hardware device;

(d) if the changed electronic design has not been successfully fit in the target hardware device, specifying one or more levels of hierarchical containment to relax; and (e) attempting to fit the changed electronic design on the target hardware device while allowing the unchanged portion of the changed electronic design to change its placement within the unchanged region of the target hardware device but only insofar as permitted within the specified one or more hierarchical containment levels.

27. The method of claim 22, wherein there are at least three levels of hierarchical containment.

28. In a compiler for placing an electronic design on a target hardware device by placing logic cells from the electronic design on logic elements of the target hardware device, the logic elements being grouped into blocks of related logic elements, the target hardware device having multiple levels of hierarchical containment together defining placement of logic from the electronic design onto the target hardware device, a method of recompiling comprising:

(a) receiving a compiled original electronic design specifying placement of logic cells from the original electronic design on logic elements of the target hardware device;

(b) accepting a change in the original electronic design to create a changed electronic design, the changed electronic design including (1) a changed portion comprising logic cells affected by the change to the design, and (2) an unchanged portion comprising logic cells not affected by the change;

(c) providing logic cells from the unchanged portion of the changed electronic design to an unchanged region of the target hardware device comprising logic elements onto which logic cells from the unchanged portion of the changed electronic design were placed in the compiled original electronic design;

(d) attempting to fit logic cells of the changed portion of the electronic design onto logic elements located outside of the unchanged region of the target hardware device while confining logic cells from the unchanged portion of the changed electronic design to remain fixed in the unchanged region of the target hardware device; and (e) if the attempt to fit fails, specifying one or more levels of hierarchical containment to relax and attempting to fit the changed electronic design on the target hardware device while allowing logic cells from the unchanged portion of the changed electronic design to shift other logic elements within the blocks in which they were placed in the compiled original design but only insofar as permitted within the specified one or more hierarchical containment levels.

29. The method of claim 28, wherein the original electronic design and the changed electronic design are provided as netlists in which the logic cells include gates and nets.

30. The method of claim 28, wherein logic elements in a single block are connected by a local interconnect.

31. The method of claim 28, wherein the changed portion of the changed electronic design includes a logic cell meeting at least one of the following criteria: its fan-in has changed, its fan-out has changed, and it was not present in the original electronic design.

32. The method of claim 28, wherein attempting to fit the changed electronic design comprises placing logic cells of changed electronic design on the target hardware device and routing lines therebetween.

33. The method of claim 28, wherein the target hardware device is a Programmable Logic Device.

34. The method of claim 28, further comprising:

(f) if the attempt to fit at (e) fails, allowing logic cells from the unchanged portion of the changed electronic design to shift other logic elements within half-rows in which they were placed in the compiled original design and attempting to fit the changed electronic design on the target hardware device, wherein the half-rows comprise a plurality of related blocks.

35. A programmable logic device containing logic cells placed according to the method of claim 28.

36. A machine readable medium comprising instructions for operating a compiler capable of placing an electronic design on a target hardware device by placing logic cells from the electronic design on logic elements of the target hardware device, the logic elements being grouped into blocks of related logic elements, the target hardware device having multiple levels of hierarchical containment together defining placement of logic from the electronic design onto the target hardware device, the instructions specifying operations comprising:

(a) receiving a compiled original electronic design specifying placement of logic cells from the original electronic design on logic elements of the target hardware device;

(b) accepting a change in the original electronic design to create a changed electronic design, the changed electronic design including (1) a changed portion comprising logic cells affected by the change to the design, and (2) an unchanged portion comprising logic cells not affected by the change;

(c) providing logic cells from the unchanged portion of the changed electronic design to an unchanged region of the target hardware device comprising logic elements onto which logic cells from the unchanged portion of the changed electronic design were placed in the compiled original electronic design;

(d) attempting to fit logic cells of the changed portion of the electronic design onto logic elements located outside of the unchanged region of the target hardware device while confining logic cells from the unchanged portion of the changed electronic design to remain fixed in the unchanged region of the target hardware device; and (e) if the attempt to fit fails, relaxing one or more hierarchical containment levels and attempting to fit the changed electronic design on the target hardware device while allowing logic cells from the unchanged portion of the changed electronic design to shift other logic elements within the blocks in which they were placed in the compiled original design but only insofar as permitted within the relaxed one or more hierarchical containment levels.

37. The machine readable medium of claim 36, wherein the original electronic design and the changed electronic design are provided as netlists in which the logic cells include gates and nets.

38. The machine readable medium of claim 36, wherein the instructions for attempting to fit the changed electronic design comprises placing logic cells of changed electronic design on the target hardware device and routing lines therebetween.

39. The machine readable medium of claim 36, wherein the target hardware device is a Programmable Logic Device.

40. The machine readable medium of claim 36, further comprising instructions for:

(f) if the attempt to fit at (e) fails, allowing logic cells from the unchanged portion of the changed electronic design to shift other logic elements within half-rows in which they were placed in the compiled original design and attempting to fit the changed electronic design on the target hardware device, wherein the half-rows comprise a plurality of related blocks.

* * * * *